(12) United States Patent
Lin et al.

(10) Patent No.: US 10,787,796 B2
(45) Date of Patent: Sep. 29, 2020

(54) COOL WATER DISCHARGING METHOD AND A SWITCH VALVE WITH COOL WATER DISCHARGING FUNCTION

(71) Applicant: XIAMEN SOLEX HIGH-TECH INDUSTRIES CO., LTD., Xiamen, Fujian (CN)

(72) Inventors: Fangqi Lin, Fujian (CN); Tangjun Dan, Fujian (CN); Weiguo Gong, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 61 days.

(21) Appl. No.: 15/362,198

(22) Filed: Nov. 28, 2016

(65) Prior Publication Data

US 2017/0191248 A1 Jul. 6, 2017

(30) Foreign Application Priority Data

Dec. 31, 2015 (CN) .......................... 2015 1 1027304

(51) Int. Cl.
*E03B 1/04* (2006.01)
*F16K 15/02* (2006.01)
(Continued)

(52) U.S. Cl.
CPC ................ *E03B 1/048* (2013.01); *E03C 1/04* (2013.01); *F16K 3/267* (2013.01); *F16K 11/072* (2013.01);
(Continued)

(58) Field of Classification Search
CPC ........ E03B 1/048; F16K 11/072; F16K 11/22; F16K 15/026; F16K 3/267; F16K 31/002; E03C 1/04
See application file for complete search history.

(56) References Cited

U.S. PATENT DOCUMENTS

| 5,368,227 A | * | 11/1994 | McGinnis | ............ G05D 23/123 236/92 R |
| 2007/0290058 A1 | * | 12/2007 | Guterman | ............... E03C 1/041 236/93 R |
| 2008/0072971 A1 | * | 3/2008 | Honeychurch | ........... E03B 1/04 137/468 |

FOREIGN PATENT DOCUMENTS

| CN | 204852482 U | 12/2015 |
| JP | H10103581 A | * 4/1998 |

OTHER PUBLICATIONS

Yamashita, Inserted Check Valve . . . , Apr. 21, 1998, JPH10103581A, Whole Document.*

* cited by examiner

*Primary Examiner* — Larry L Furdge
(74) *Attorney, Agent, or Firm* — Cooper Legal Group, LLC (57) ABSTRACT

A cool water discharging method and a switch valve includes a valve body and a valve spool. The valve body is disposed with a thermosensitive module, an inlet passage, a first outlet passage, and a second outlet passage. The valve body has a cool water discharging passage connected to the inlet passage, a discharging hole connecting the first outlet passage and the cool water discharging passage and an air suction hole connecting the second outlet passage and the cool water discharging passage. When discharging cool water, water flows to the cool water discharging passage rapidly, the air in the second outlet passage is absorbed to the cool water discharging passage. The residual cool water in the second outlet passage is absorbed to the cool water discharging passage through the air suction hole and discharged out with the residual cool water in the first outlet passage.

12 Claims, 5 Drawing Sheets

(51) Int. Cl.
*E03C 1/04* (2006.01)
*F16K 11/072* (2006.01)
*F16K 31/00* (2006.01)
*F16K 3/26* (2006.01)
*F16K 11/22* (2006.01)

(52) U.S. Cl.
CPC ............ *F16K 11/22* (2013.01); *F16K 15/026* (2013.01); *F16K 31/002* (2013.01)

COOL WATER DISCHARGING METHOD AND A SWITCH VALVE WITH COOL WATER DISCHARGING FUNCTION

FIELD OF THE INVENTION

The present invention relates to a cool water discharging method and a switch valve with cool water discharging function

BACKGROUND OF THE INVENTION

Before taking a shower, especially in winter, people need to discharge the residual cool water in the water plumbing firstly, and then wait for the warm water. The traditional way to discharge the cool water is mostly applied with the manual operation mode, that is to switch the valve to flow out warm water until the discharging of cool water is finished. This way needs users to touch water by hand to feel the water temperature, so that the users may feel cold by the cool water or be scalded by the hot water.

Therefore, someone designed a constant temperature water economizer published in the Chinese patent database with announcement number CN204852482U, of which the valve body is disposed with temperature sensing element and constant temperature piston, by using the temperature sensing element to detect water temperature, once the temperature is low, the temperature sensing element will drive the constant temperature piston to move to close the cool water passage, and it would open the cool water passage gradually only until the water temperature rises to make the water temperature stable. However, this structure is suitable when there is only one water passage, that is to say, it needs one set of temperature sensing element and constant temperature piston corresponding to one water passage, but the existing shower system generally comprising a overhead shower and a hand shower, so if there are two sets of temperature sensing element and constant temperature piston in the switch valve, it will enlarge the size of the valve and increase the amount of functional elements, then resulting in high cost and complicated structure of the product.

SUMMARY OF THE INVENTION

The present invention is provided with a cool water discharging method and a switch valve with cool water discharging function, which can discharge cool water in two water passages at the same time. The technical proposal of the present invention is that:

A switch valve with cool water discharging function, comprising a valve body, a valve spool and a thermosensitive module disposed in the valve body is provided. The valve body is disposed with an inlet passage and a first outlet passage and a second outlet passages respectively connected to the inlet passage. The valve body is further disposed with a cool water discharging passage connected to the inlet passage, a discharging hole connecting the first outlet passage and the cool water discharging passage and an air suction hole connecting the second outlet passage and the cool water discharging passage. The thermosensitive module is used to open and close the discharging hole. When discharging cool water, the valve spool fluidly disconnects the second outlet passage from the inlet passage, water flows to the cool water discharging passage through the inlet passage, suction force generated by the water flowing to the cool water discharging passage causes the residual cool water in the second outlet passage to move into the cool water discharging passage through the air suction hole, and water flowing through the discharging hole mixes with the residual cool water in the first outlet passage to exhaust out from the outlet of the first outlet passage. When the water temperature rises to the preset value, the thermosensitive module closes the discharging hole to finish the cool water discharging.

In another preferred embodiment, a check valve used to open and close the second outlet passage is provided movably in the second outlet passage, the check valve opens the second outlet passage by the driving of the suction force; when the valve spool closes the first outlet passage and the cool water discharging passage, water flows to the second outlet passage through the one-way water hole in the check valve, at the same time the check valve closes the second outlet passage.

In another preferred embodiment, the internal wall of the second outlet passage is protruding inwardly with a sealing ring, an elastic element is further provided to push the check valve to press on the sealing ring so as to close the second outlet passage; a cool water discharging clearance is formed between the check valve and the internal wall of the second outlet passage, the cool water discharging clearance is connected to the air suction hole.

In another preferred embodiment, a joint is disposed in the second outlet passage, the elastic element is disposed in the joint, the check valve is movably sleeved on the joint to cover the elastic element.

In another preferred embodiment, a speed-up passage is disposed at the front end of the cool water discharging passage, the speed-up passage is connected to the inlet passage, the water flowing area at the central portion of the speed-up passage is smaller than that at the two end portions of the speed-up passage, the air suction hole is connected to the rear end portion of the speed-up passage.

In another preferred embodiment, the thermosensitive module comprises a flexible stick and a port used to open and close the discharging hole, the port is connected to the flexible stick.

In another preferred embodiment, the thermosensitive module is disposed in the cool water discharging passage; when the water temperature is lower than the preset value, the flexible stick is situated in contracting state, the port opens the discharging hole; when the water temperature is higher than the preset value, the flexible stick is situated in extending state, the port closes the discharging hole.

In another preferred embodiment, the thermosensitive module further comprises a reset element, the flexible stick and the reset element are respectively disposed at two sides of the discharging hole to clamp the port.

In another preferred embodiment, the thermosensitive module further comprises a shaft sleeve base, the shaft sleeve base is connected to the internal wall of the cool water discharging passage in sealing way, the reset element and the port are disposed in the shaft sleeve base, the central portion of the port is disposed with a passage running through the port in the axial direction, the flexible stick pushes the port to move in the axial direction, the shaft sleeve base is disposed with a gap corresponding to the discharging hole.

Cool water discharging method, wherein to discharge cool water, the water flows quickly through a cool water discharging passage and flows to a first outlet passage, the water mixes with the cool water residual cool water in the first outlet passage and the mixing water discharges out of the outlet of the first outlet passage; when the water flows quickly through the cool water discharging passage, suction force generates to absorb the residual cool water in a second outlet passage to the cool water discharging passage, the mixing water discharges out of the outlet of the first outlet passage; when the thermosensitive module senses that the temperature of the water discharged out of the outlet of the first outlet passage rises to the preset value, the thermosensitive module cuts off the connecting of the first outlet passage and the cool water discharging passage, water doesn't flow out of the first outlet passage, the cool water discharging is finished.

In another preferred embodiment, the flexible stick of the thermosensitive module extends when the water temperature rises to the preset value to drive the port to move, the port closes the discharging hole connecting the first outlet passage and the cool water discharging passage.

Compared to the existing known technology, the technical proposal of the present invention has advantages:
1. The air suction hole connects the second outlet passage and the cool water discharging passage, when discharging cool water, water flows to the cool water discharging passage rapidly, with the Venturi effect, the air in the second outlet passage is absorbed to the cool water discharging passage, negative pressure generates in the second outlet passage, the residual cool water in the second outlet passage is absorbed to the cool water discharging passage through the air suction hole and discharged out with the residual cool water in the first outlet passage, the present invention can discharge cool water in the first outlet passage and the second outlet passage at the same time. When the water temperature rises to the preset value, the thermosensitive module closes the discharging hole to finish the discharging, it avoids waste of water resource and water temperature test by human being, the structure is compact, it only needs one thermosensitive module, it has less functional components, it is simple structural and it costs low.
2. The check valve is disposed in the second outlet passage, when in normal use, the valve spool opens the second outlet passage, water enters the second outlet passage from the one-way water hole of the check valve, the check valve closes the second outlet passage, the check valve can prevent water reversely flowing through the air suction hole to the cool water discharging passage. Especially, the elastic element pushes the check valve to press on the sealing ring to close the second outlet passage, which efficiently ensures the sealing performance of the check valve and the sealing ring.

BRIEF DESCRIPTION OF THE DRAWINGS

The present invention will be further described with the drawings and the embodiments.

DETAILED DESCRIPTION OF THE EMBODIMENTS

Figure 1:
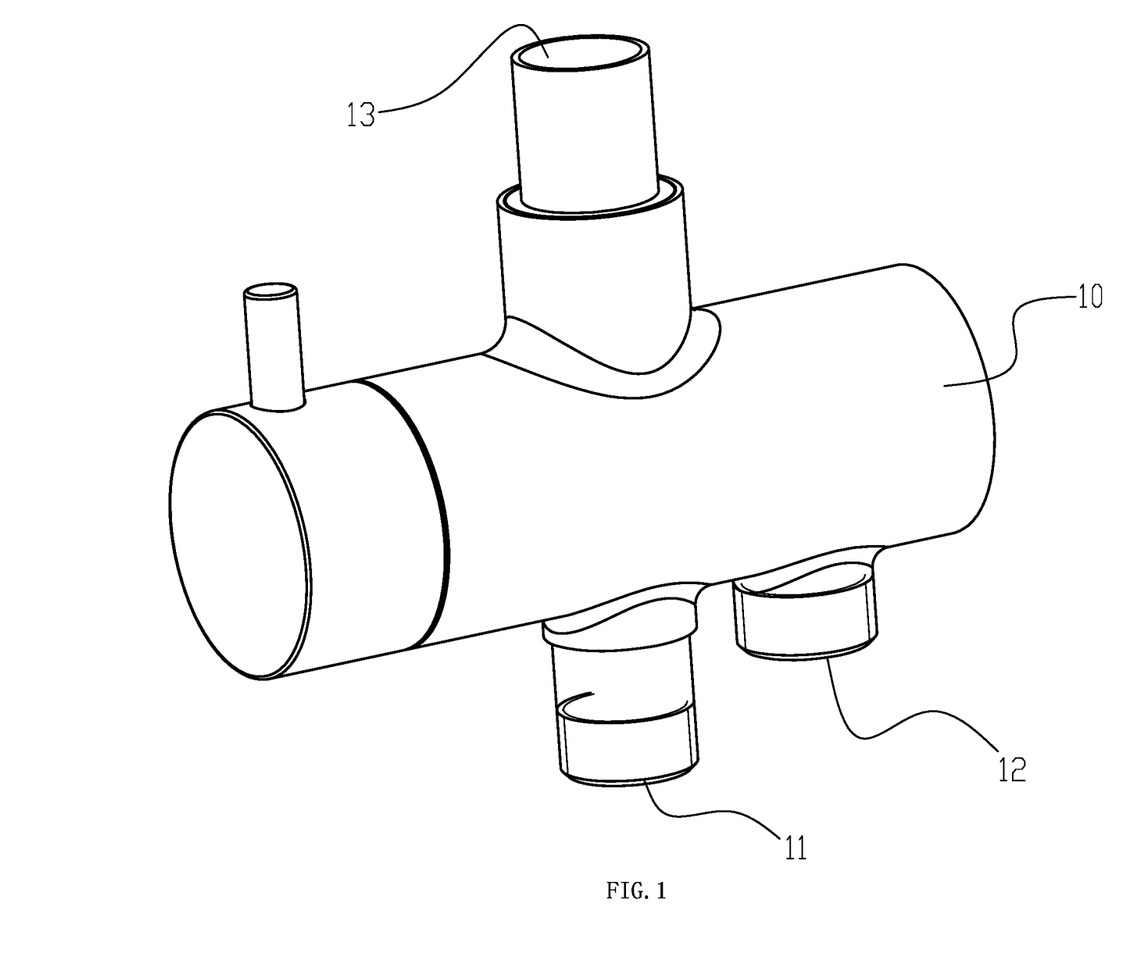
FIG. 1 illustrates a schematic diagram of the switch valve with cool water discharging function of the present invention.
Figure 2:
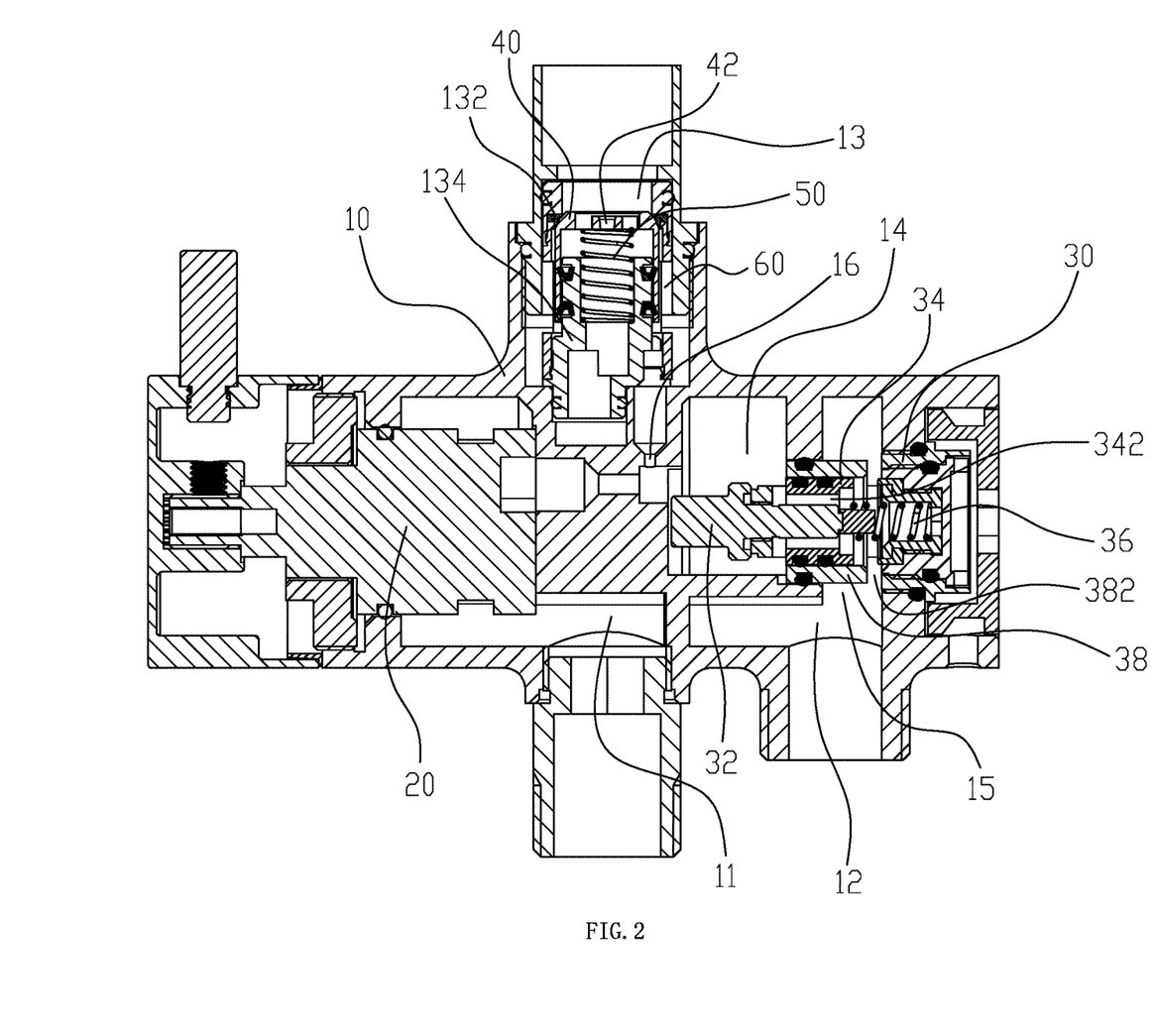
FIG. 2 illustrates a sectional diagram of the switch valve with cool water discharging function of FIG. 1.
Figure 3:
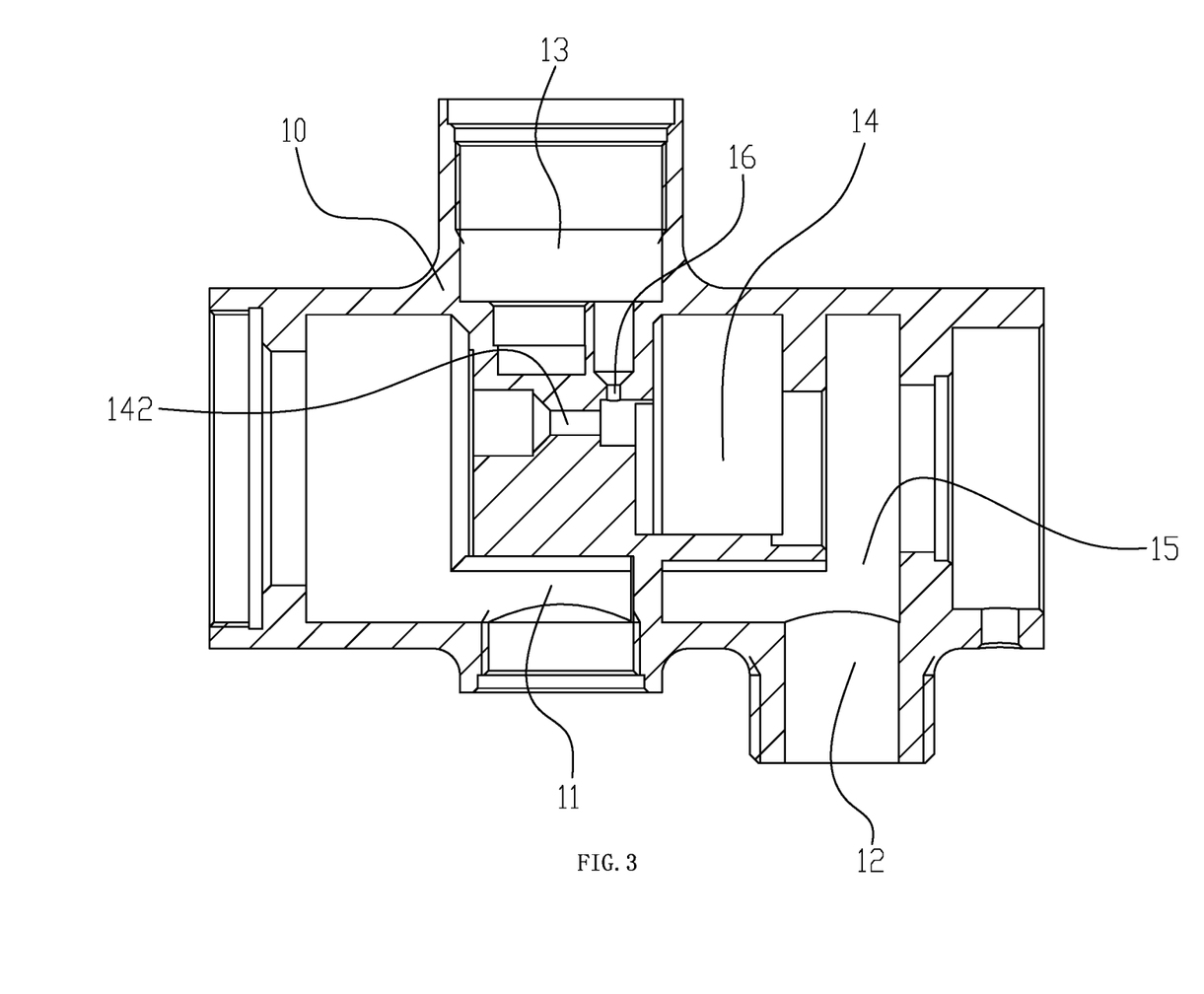
FIG. 3 illustrates a sectional diagram of the valve body of the switch valve with cool water discharging function of FIG. 1.

Referring to FIGS. 1-3, a switch valve with cool water discharging function of the present invention comprises a valve body 10, a valve spool 20 disposed in the valve body and a thermosensitive module 30. The valve body 10 is disposed with an inlet passage 11, a first outlet passage 12 connected to the inlet passage 11, a second outlet passage 13 connected to the inlet passage 11 and a cool water discharging passage 14 connected to the inlet passage 11. The valve body 10 is further disposed with a discharging hole 15 connecting the first outlet passage 12 and the cool water discharging passage 14 and an air suction hole 16 connecting the second outlet passage 13 and the cool water discharging passage 14. When water flows through the cool water discharging passage 14, air in the second outlet passage 13 is sucked to the cool water discharging passage 14 by the driving of the water flowing through the air suction hole 16, so that negative pressure generates in the second outlet passage 13. The valve spool 20 is used to close any two of the first outlet passage 12, the second outlet passage 13 and the cool water discharging passage 14 to open the rest one. The thermosensitive module 30 is used to open and close the discharging hole 15, in detailed, when the thermosensitive module 30 detects cool water, it opens the discharging hole 15 to discharge cool water, when the thermosensitive module 30 detects warm water, it closes the discharging hole 15.

Figure 4:
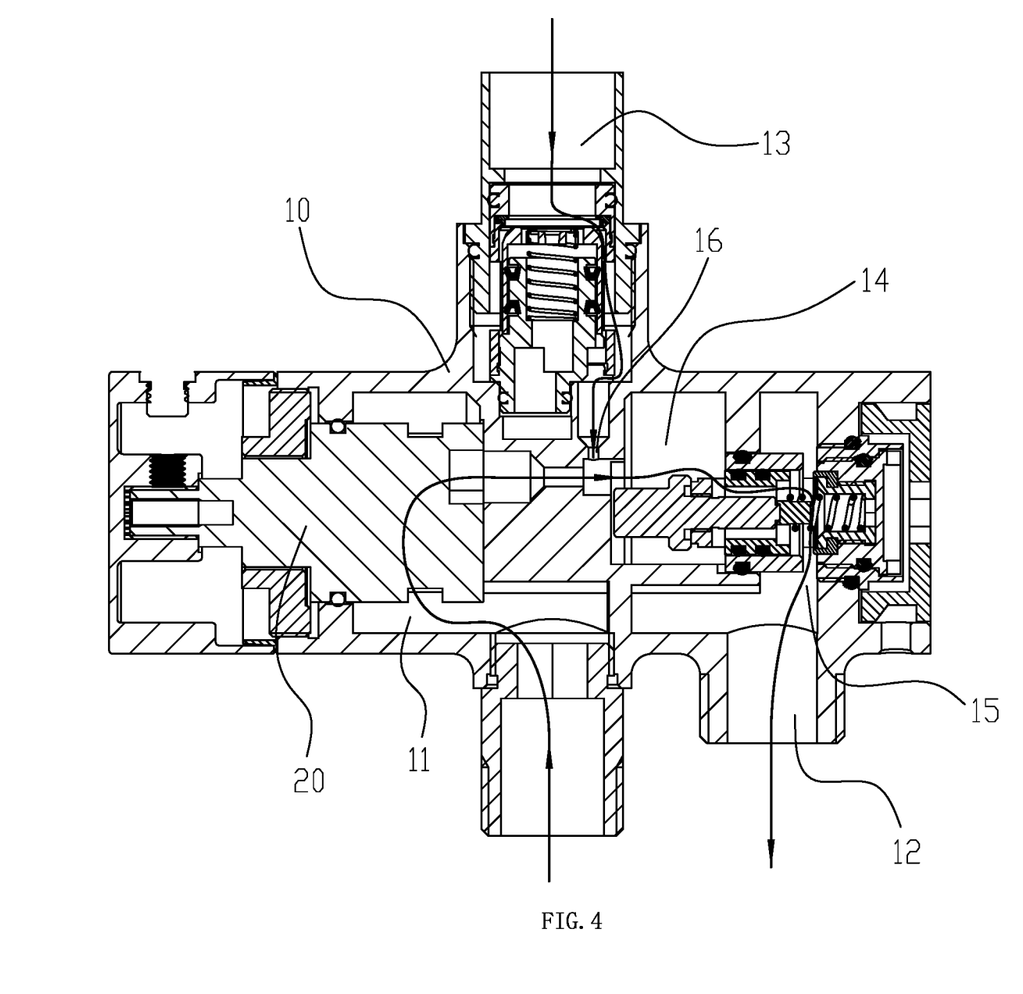
FIG. 4 illustrates a sectional diagram of the switch valve with cool water discharging function of FIG. 1 when discharging cool water.
Figure 5:
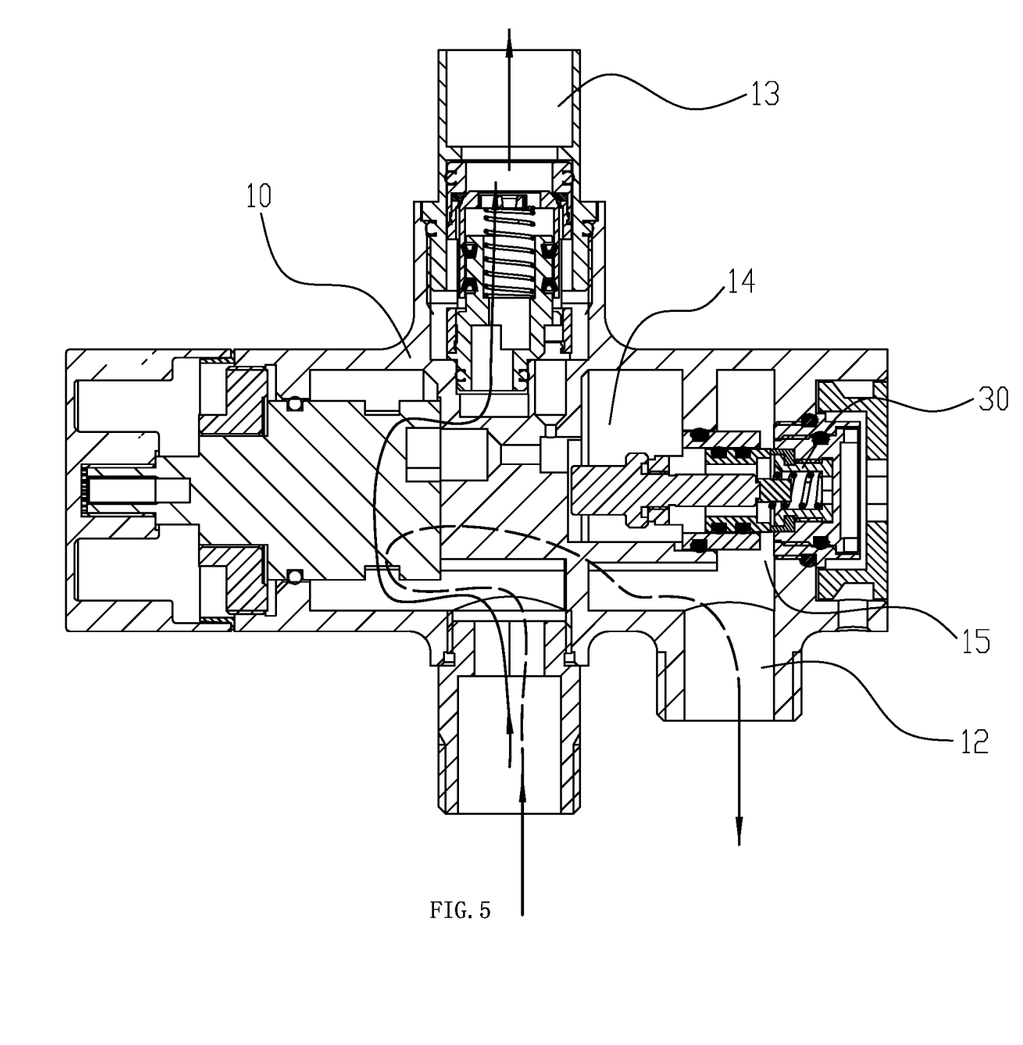
FIG. 5 illustrates a sectional diagram of the switch valve with cool water discharging function of FIG. 1 when water flows out normally.

Referring to FIG. 4, when discharging cool water, the valve spool 20 fluidly disconnects the second outlet passage 13 from th inlet passage 11, water enters the cool water discharging passage 14 through the inlet passage 11, flowing water speeds up and generates Venturi effect, flowing water generates suction force to make the residual cool water in the second outlet passage flow into the cool water discharging passage 14, water flows through the discharging hole 15 to mix with the residual cool water in the first outlet passage 12 to discharge out from the outlet of the first outlet passage 12. Referring to FIG. 5, when the water temperature rises to the preset value, the thermosensitive module 30 automatically closes the discharging hole 15, water cannot flow out of the first outlet passage 12, and the cool water discharging is finished. Referring to FIG. 5, the valve spool 20 is switched to close the first outlet passage 12 and the cool water discharging passage 14 and open the second outlet passage 13, and warm water discharges out of the second outlet passage 13. In other cases, it closes the second outlet passage 13 and the cool water discharging passage 14 and opens the first outlet passage 12, and warm water discharges out of the first outlet passage 12. Referring to FIG. 2 and FIG. 3, in a preferred embodiment, the valve spool 20 is disposed in the inlet passage 11. The first outlet passage 12 is situated below one end of the cool water discharging passage 14 to connect to an overhead shower head, and the second outlet passage 13 is situated above the other end of the cool water discharging passage 14 to connect to a hand shower head.

Preferred, the switch valve further comprises a check valve 40 movably disposed in the second outlet passage 13 to open and close the second outlet passage 13. The check valve 40 is a housing with bottom opening, the check valve 40 moves downwardly by the driving of the suction force to open the second outlet passage 13. When discharging cool water, once the thermosensitive module 30 closes the discharging hole 15, water enters the second outlet passage 13 through the suction hole 16, the water pressure works on the end face of the bottom portion of the check valve 40 to push the check valve upwardly, the check valve 40 moves upwardly to close the second outlet passage 13. When water flows out normally, when the valve spool 20 closes the first outlet passage 12 and the cool water discharging passage 14 and opens the second outlet passage 13, water enters the second outlet passage 13 from the one-way water hole 42 of the check valve 40, the internal surface of the top portion of the check valve 40 is pressed upwardly by water, the check valve 40 moves upwardly to close the second outlet passage 13, thus prevent water from flowing reversely.

Preferred, the internal wall of the second outlet passage 13 is protruding inwardly with a sealing ring 132, an elastic element (in this embodiment, a spring) 50 is further provided to push the check valve 40 to press on the sealing ring 132 so as to close the second outlet passage, a cool water discharging clearance 60 is formed between the check valve 40 and the internal wall of the second outlet passage 13, the cool water discharging clearance 60 is connected to the air suction hole 16. Preferred, the second outlet passage 13 is disposed with a joint 134, the elastic element 50 is disposed in the joint 134, the check valve 40 is movably sleeved on the joint 134 to cover the elastic element 50. Once the cool water discharging is finished, even when there is no water pressure, the elastic element 50 can push the check valve 40 to close the second outlet passage 13. Preferred, a speed-up passage 142 is disposed at the front end of the cool water discharging passage 14, the speed-up passage 142 is connected to the inlet passage 11, the water flowing area at the central portion of the speed-up passage 142 is smaller than that at two ends of the speed-up passage 142, the air suction hole 16 is connected to the rear end portion of the speed-up passage 142.

Preferred, the thermosensitive module 30 comprises a flexible stick 32 and a port 34 used to open and close the discharging hole 15, the port 34 is connected to the flexible stick 32, the flexible stick 32 moves axially to drive the port 34 to open or close the discharging hole 15. In this embodiment, the thermosensitive module 30 is disposed in the cool water discharging passage 14, when the water temperature is lower than the preset value, the flexible stick 32 is situated in contracting state, the port opens the discharging hole; when the water temperature is higher than the preset value, the flexible stick 32 is situated in extending state, the port 34 closes the discharging hole 15.

Preferred, the thermosensitive module 30 further comprises a reset element 36 (in this embodiment, a spring), the flexible stick 32 and the reset element 36 are respectively disposed at two sides of the discharging hole 15 to clamp the port 34. The thermosensitive module 30 further comprises a shaft sleeve base 38, the shaft sleeve base 38 is connected to the internal wall of the cool water discharging passage 14 in sealing way, the reset element 36 and the port 34 are disposed in the shaft sleeve base 38, the central portion of the port 34 is disposed with a passage 342 running through the port 34 in the axial direction, the flexible stick 32 pushes the port 34 to move in the axial direction, the shaft sleeve base 38 is disposed with a gap 382 corresponding to the discharging hole 15.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A switch valve with a cool water discharging function, comprising:
   a valve body,
   a valve spool, and
   a thermosensitive module disposed in the valve body, wherein:
   the valve body is disposed with an inlet passage, a first outlet passage, and a second outlet passage,
   the first outlet passage and the second outlet passage are configured to be respectively connected to the inlet passage,
   the valve body is further disposed with a cool water discharging passage configured to be connected to the inlet passage,
   a discharging hole connects the first outlet passage and the cool water discharging passage,
   a cool water discharging clearance connects the second outlet passage and the cool water discharging passage,
   when the valve spool is switched to a position such that the inlet passage is connected to the cool water discharging passage and the inlet passage is fluidly disconnected from the second outlet passage:
      water flows into the cool water discharging passage through the inlet passage,
      suction force generated by the water flowing to the cool water discharging passage from the inlet passage creates negative pressure that causes residual water from the second outlet passage to move into the cool water discharging passage through the cool water discharging clearance,
      the water from the inlet passage and the residual water from the second outlet passage flow out from the cool water discharging passage and the discharging hole to mix with residual water from the first outlet passage to obtain mixed water,
      the mixed water flows out from an outlet of the first outlet passage, and
      when a temperature of the mixed water rises to a preset value, the thermosensitive module disconnects the discharging hole from the cool water discharging passage.

2. The switch valve with cool water discharging function according to claim 1, wherein:
   a check valve is provided movably in the second outlet passage,
   and
   when the valve spool is switched to a second position such that the inlet passage is connected to the second outlet passage and the inlet passage is disconnected from the first outlet passage and the cool water discharging passage, water flows into the second outlet passage through a one-way water hole in the check valve.

3. The switch valve with cool water discharging function according to claim 2, further comprising:
   a sealing ring, and
   a spring configured to push the check valve to press on the sealing ring, wherein:
      the cool water discharging clearance is formed between the check valve and an internal wall of the second outlet passage.

4. The switch valve with cool water discharging function according to claim 3, wherein:
   a joint is disposed in the second outlet passage,
   the spring is disposed in the joint, and
   the check valve is movably sleeved on the joint to cover the spring.

5. The switch valve with cool water discharging function according to claim 1, wherein:
   a speed-up passage is disposed at a front end of the cool water discharging passage,
   the speed-up passage is connected to the inlet passage, a water flowing area at a central portion of the speed-up passage is smaller than a water flowing area at a front end portion and a rear end portion of the speed-up passage, and an air suction hole is connected to the rear end portion of the speed-up passage.

6. The switch valve with cool water discharging function according to claim 1, wherein:

the thermosensitive module comprises a flexible stick and a port configured to open or close the discharging hole, and the port is connected to the flexible stick.

7. The switch valve with cool water discharging function according to claim 6, wherein:

the thermosensitive module is disposed in the cool water discharging passage, when the temperature of the water in the cool water discharging passage is lower than the preset value, the flexible stick is situated in a contracting state and the port opens the discharging hole, and when the temperature of the water in the cool water discharging passage is equal to or higher than the preset value, the flexible stick is situated in an extending state and the port closes the discharging hole.

8. The switch valve with cool water discharging function according to claim 7, wherein:

the thermosensitive module further comprises a reset spring, and one end of the flexible stick and one end of the reset spring are respectively disposed at two sides of the discharging hole to clamp the port.

9. The switch valve with cool water discharging function according to claim 8, wherein:

the thermosensitive module further comprises a shaft sleeve base, the shaft sleeve base is connected to an internal wall of the cool water discharging passage in a sealing manner, the reset spring and the port are disposed in the shaft sleeve base, a central portion of the port is disposed with a passage running through the port in an axial direction, the flexible stick pushes the port to move in the axial direction, and the shaft sleeve base is disposed with a gap corresponding to the discharging hole.

10. A method performed by a switch valve with a cool water discharging function, wherein:

the switch valve comprises:
a valve body,
a valve spool, and
a thermosensitive module disposed in the valve body, wherein:
the valve body is disposed with an inlet passage,
a first outlet passage and a second outlet passage are configured to be respectively connected to the inlet passage,
the valve body is further disposed with a cool water discharging passage configured to be connected to the inlet passage,
a discharging hole connects the first outlet passage and the cool water discharging passage,
an air suction hole connects the second outlet passage and the cool water discharging passage, and
the thermosensitive module is configured to open and close the discharging hole, and the method comprises:
enabling discharging of cool water by fluidly disconnecting by the valve spool, the inlet passage from the second outlet passage and connecting the inlet passage to the cool water discharging passage, causing water to flow to the cool water discharging passage through the inlet passage,
generating suction force by the water flowing to the cool water discharging passage to create negative pressure that causes residual cool water in the second outlet passage to move into the cool water discharging passage through the air suction hole,
mixing water flowing through the discharging hole with residual cool water in the first outlet passage to obtain mixed water,
discharging the mixed water from an outlet of the first outlet passage, and
when a temperature of the mixed water rises to a preset value, closing, by the thermosensitive module, the discharging hole to end the discharging of the cool water.

11. The switch valve with cool water discharging function according to claim 9, wherein:

the gap is between one end of the reset spring and the port in the axial direction.

12. The switch valve with cool water discharging function according to claim 9, wherein the water flowing into the cool water discharging passage from the inlet passage creates a positive pressure to close an air suction hole between the cool water discharging passage and the cool water discharging clearance.

\* \* \* \* \*